July 16, 1935.  W. C. MILLER  2,007,972
PATCHING DEVICE
Filed March 26, 1934
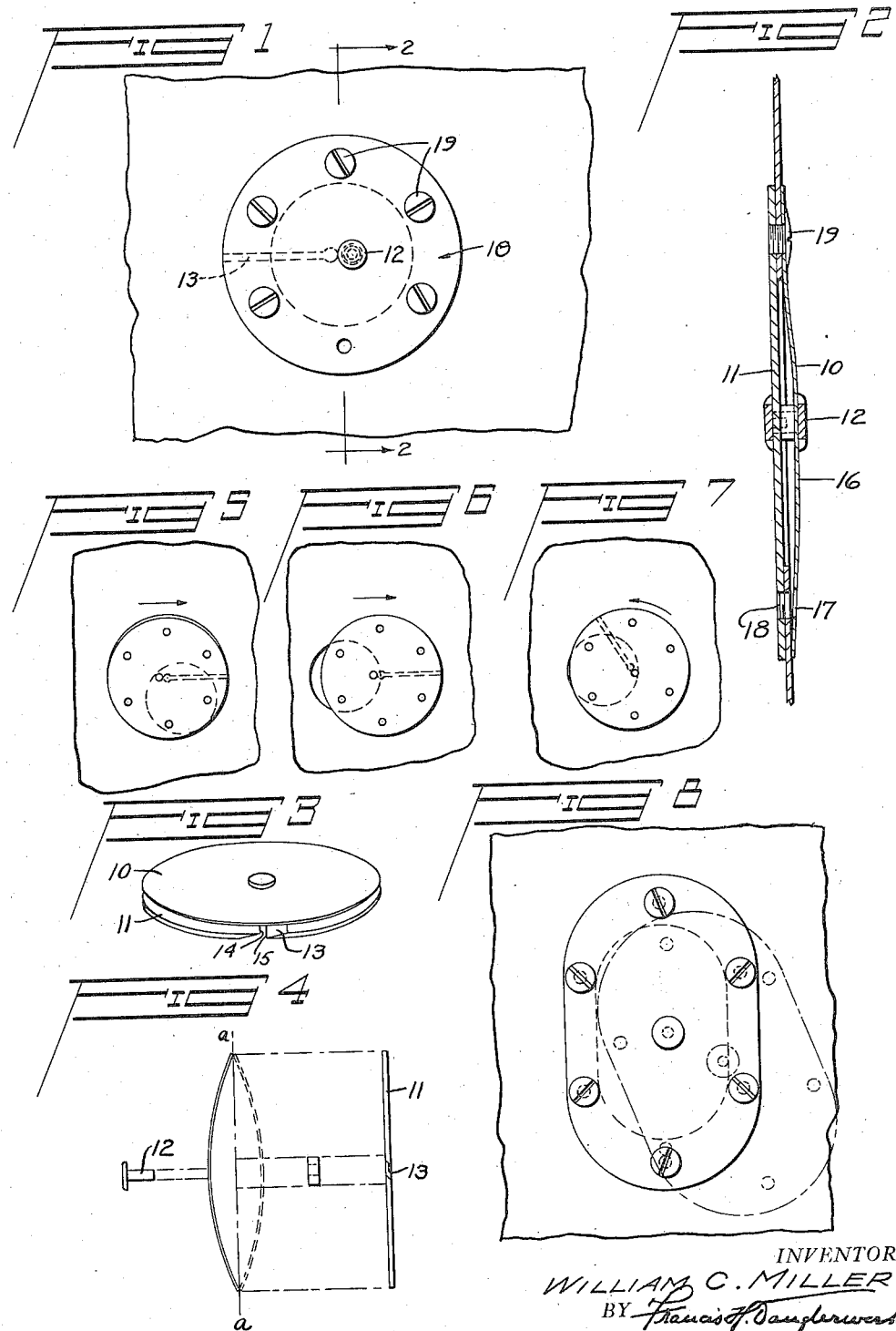
INVENTOR
WILLIAM C. MILLER
BY
ATTORNEYS Patented July 16, 1935

2,007,972

UNITED STATES PATENT OFFICE 2,007,972

PATCHING DEVICE

William C. Miller, Kenmore, N. Y.

Application March 26, 1934, Serial No. 717,415

13 Claims. (Cl. 114—227)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to patching devices, and more particularly to patches adapted for repairing holes or other minor damages in sheet metal articles or skin coverings, both on the inside and outside. The invention is capable of use in connection with the repairing or patching of holes in pontoons, tanks, the hulls of vessels or ships and the like, as well as in patching or repairing holes in the skin coverings of fuselages and airfoil or other surfaces of aircraft and is especially applicable to places ordinarily inaccessible from the inside.

The invention has for its primary object an improved construction of patch which will facilitate the application of the patch both to the inside and outside of an aperture at the same time and one capable of causing the two parts of the device to be held in gripping engagement tightly against the skin or other surface being mended, as the case may be.

A further object of the present invention is to provide a patching device comprising opposed head plates, one of which consists of a resilient disk which utilizes the buckling property of metals to produce a tight closure or fit over any aperture by causing the same to buckle in two reverse positions within such limits as not to disturb molecular formation and in such wise that when the disk is in one of two positions the patching device will grippingly engage the skin surface surrounding the aperture and when in the other position it will be released from gripping engagement therewith. Pressure on the rim of the resilient disk produces convexity to draw the plates together and lock the same in place over the aperture; pressure on the resulting convexity causes the resilient disk to buckle in a reverse direction and permits removal of the patching device. Thus, the process may be repeated indefinitely so that the patching device may be repeatedly applied, removed and reapplied.

The nature of the invention will be understood from the following detailed description when read in connection with the accompanying drawing and the novel features will be clearly pointed out in the appended claims.

In the accompanying drawing, which illustrates certain embodiments of my invention:

Fig. 1 is a plan view of the patching device mounted in place over an opening to be mended;

Fig. 2 is a sectional view taken on line 2—2 of Fig. 1;

Fig. 3 is a perspective view of the patching device per se;

Fig. 4 is an exploded view of the patching device shown in Fig. 3;

Figs. 5, 6 and 7 illustrate the manner of threading the patching device through the opening to be covered; and Fig. 8 is a modified form of the patching device.

Referring more particularly to the drawing, wherein corresponding parts are designated by like numerals throughout the several views, the device in one embodiment of my invention herein illustrated comprises a pair of opposing head plates 10 and 11 of metal or any other suitable material, which, as shown in Fig. 1, are circular in form, but other shapes may be employed without departing from the spirit of the invention. The head plates 10 and 11 are rigidly and permanently connected by a centrally located stiff, non-contractile stem 12.

In the form of the device illustrated in Fig. 1, the plate 11 is preferably substantially flat in shape, made from sheet material and has or may have a slot 13 extending from its rim to nearly the center of the plate and of sufficient width to admit the thickness of the material of the patch. The slot 13 may be cut at an angle as shown in Fig. 3 to provide oppositely disposed knife edges 14 and 15 to facilitate the insertion of its entering edge into the hole to be covered.

The head plate 10, as shown in Fig. 1, comprises a circular disk of resilient material provided with a central bulged portion 16 capable of being sprung into two reverse positions, the bulge being on one side of a plane of reference indicated by the line a—a as shown in Fig. 4 when one of two positions is assumed and on the other side of the plane of reference when the other position is assumed.

In applying my invention to repair or patch a hole, the plate 11 is threaded through the hole into the inside of the surface to be repaired which can be readily accomplished by first inserting one of the knife edges of the slot through the hole in the manner indicated in Fig. 5 and then rotating the plate until it has passed through the hole, thereafter properly spacing the plate equidistantly around the rim of the opening. Pressure on the rim of the plate 10 thereafter produces convexity, as shown in Fig. 2 to draw the plates together and grippingly engage the surface of the material around the hole. Likewise pressure on the resulting convexity causes the plate 10 to be sprung outwardly and permits the removal of the plate 11 from the hole by threading the same therethrough in the manner indicated above. Thus, the process can be repeated indefinitely.

The plate 10 is provided with a plurality of radially disposed equidistantly spaced openings 17 disposed adjacent to the periphery of the plate 10. These openings are aligned longitudinally with a corresponding number of similarly disposed threaded openings 18 provided in the plate 11. Screws 19 are provided having heads bearing on the one face of the plate 10, each being provided with an unthreaded shank portion positioned in the openings 17. In practice when it is desired to lock the patch in place and thus secure it in position about the aperture the screws 19 are threaded into the threaded openings 18 in the plate 11 to cause the plates to be drawn toward one another and positively grip the material surrounding the opening therebetween.

Fig. 8 illustrates a further modification of the patching device wherein the head plates are substantially rectangular in shape to cover an opening similar in shape but smaller in dimension than the dimensions of the head plates. In patching holes of this general shape it is possible to thread the lower plate through the opening in the manner described above. However, in such cases the lower plate need not be provided with a slot as in the case of circular head plates, it becoming readily apparent that the lower plate may be threaded into the opening by rotation of the plate, as shown in Fig. 8. Thus, it will be seen that I have provided a patching device not only exceedingly simple in construction, but one which is very easily and quickly applied to effectually patch or repair openings in skin or other surfaces and which can be repeatedly applied, removed and reapplied without damage to the patching device.

I claim:

1. A patching device comprising, a pair of opposed head plates connected by a stem, at least one of said plates comprising a cup-shaped, resilient, metallic disk capable of being buckled into a reverse position and maintained in gripping contactual relationship with its opposed head plate by leverage stress induced by the buckling movement.

2. A patching device comprising, a pair of opposed head plates connected by a stem, at least one of said plates comprising a cup-shaped, resilient, metallic disk capable of being buckled peripherally into a reverse position and maintained in gripping relationship with the peripheral edge of its opposed head plate by a constant stress induced by its own resiliency.

3. A patching device comprising, a pair of opposed head plates spaced from one another and rigidly connected by a central stem, one at least of said plates comprising a resilient, metallic disk of generally convex form capable of being buckled inwardly or reversed in its convexity, whereupon it presses against the peripheral edge of its opposing head plate by a self-induced elasticity.

4. A patching device comprising, a pair of opposed head plates rigidly connected by a stem, one at least of said plates comprising a resilient disk having a central bulged portion capable of being sprung into two reverse positions, the bulge being on one side of a plane of reference when one of two positions is assumed to cause said plate to grippingly engage its opposed plate and on the other side of the plane of reference when the other position is assumed to release said plate from its gripping relation.

5. A patching device comprising, a pair of opposed head plates rigidly connected by a central stem, one at least of said plates comprising a resilient disk adapted for being snapped into releasable gripping engagement with its opposed plate by buckling in one direction and releasable from said last mentioned plate by buckling in the reverse direction.

6. A patching device comprising, a pair of opposed head plates rigidly connected by a stem, one of said plates being substantially flat, the other plate being of resilient material and having a central bulged portion capable of being sprung into two reverse positions, the bulge being on one side of a plane of reference when one of two positions is assumed to cause said plate to grippingly engage its opposed plate peripherally and on the other side of said plane of reference when the other position is assumed to release said plate from its gripping position.

7. A patching device comprising, a pair of opposed head plates rigidly connected by a stem, one of said plates being substantially flat, the other plate being of resilient material and having a central bulged portion capable of being sprung into two reverse positions, the bulge being on one side of a plane of reference when one of two positions is assumed to cause said plate to grippingly engage its opposed plate peripherally and on the other side of said plane of reference when the other position is assumed to release said plate from its gripping position, said first mentioned plate being provided with a slot to facilitate its being threaded through an aperture.

8. A patching device comprising, a pair of opposed head plates rigidly connected by a stem, one of said plates being substantially flat, the other plate being of resilient material and having a central bulged portion capable of being sprung into two reverse positions, the bulge being on one side of a plane of reference when one of two positions is assumed to cause said plate to grippingly engage its opposed plate peripherally and on the other side of said plane of reference when the other position is assumed to release said plate from its gripping position, said flat plate being provided with a slot extending from its rim to substantially the center of said plate to facilitate its being threaded through an aperture smaller than the size of said plate.

9. A patching device comprising, a pair of opposed head plates rigidly connected by a central stem, at least one of said plates comprising a sheet of resilient metal of generally convex form, pressure on the rim of which causes said sheet to be buckled inwardly and reverse its convexity whereupon it presses against its opposing head plate by a constant stress induced by its own elasticity.

10. A patching device comprising, a pair of opposed head plates connected by a stem, at least one of said plates comprising a cup-shaped, resilient, metallic disk capable of being buckled into a reverse position and maintained in gripping contactual relationship with its opposed head plate by leverage stresses induced by the buckling movement, and auxiliary means for holding said plates together.

11. A patching device comprising, a pair of opposed head plates connected by a stem, one at least of said plates comprising a cup-shaped, resilient, metallic disk capable of being buckled peripherally into a reverse position and maintained in gripping contactual relationship with the peripheral edge of its opposed head plate by a constant stress induced by its own elasticity, and means for drawing said plates together, said means comprising one or more apertures in one of said plates, screws having heads bearing on one face of said plate, each being provided with an unthreaded shank portion positioned in said plate apertures, the other plate being provided with a corresponding number of threaded apertures in alignment with said first-mentioned apertures to thread said screws thereon and force the second plate towards the first plate.

12. A patching device comprising, a pair of opposed head plates connected by a stem, one at least of said plates comprising a cup-shaped, resilient, metallic disk capable of being buckled into a reverse position and maintained in gripping contactual relationship with its opposed head plate by leverage stresses induced by the buckling movement, and means for drawing said plates together, said means comprising a plurality of radially arranged apertures in one of said plates, screws having heads bearing on one face of said plate, each being provided with an unthreaded shank portion positioned in said apertures, the other plate being provided with a corresponding number of radially arranged threaded apertures in axial alignment with said first-mentioned aperture to thread said screws thereon and force the second plate towards the first plate.

13. A patching device comprising, a pair of opposed head plates connected by a stem, one at least of said plates comprising a cup-shaped, resilient, metallic disk capable of being buckled peripherally to a reverse position and maintained in gripping relationship with the peripheral edge of its opposing head plates by a self-induced elasticity, and means for drawing said plates together, said means comprising a plurality of radially arranged equidistantly spaced apertures in one of said plates adjacent to its periphery, screws having head bearing on one face of said plate, each being provided with an unthreaded shank portion positioned in said apertures, the other plate being provided with a corresponding number of threaded apertures in axial alignment with said first-mentioned apertures to thread said screws thereon and force the second plate towards the first plate.

WILLIAM C. MILLER.